(12) United States Patent
Gehrke et al.

(10) Patent No.: US 10,982,608 B2
(45) Date of Patent: Apr. 20, 2021

(54) SYSTEM AND METHOD FOR ESTIMATING ENGINE PERFORMANCE

(71) Applicant: Caterpillar Inc., Deerfield, IL (US)

(72) Inventors: Christopher R. Gehrke, Chillicothe, IL (US); Anthony T. Petrou, Peoria, IL (US); David A. Pierpont, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 8 days.

(21) Appl. No.: 16/388,686

(22) Filed: Apr. 18, 2019

(65) Prior Publication Data

US 2020/0332733 A1     Oct. 22, 2020

(51) Int. Cl.
| | | |
|---|---|---|
| *F02D 41/04* | (2006.01) | |
| *F02D 41/14* | (2006.01) | |
| *F16H 63/50* | (2006.01) | |
| *G05B 17/02* | (2006.01) | |

(52) U.S. Cl.
CPC ....... *F02D 41/045* (2013.01); *F02D 41/1497* (2013.01); *F02D 2200/1004* (2013.01); *F02D 2200/501* (2013.01); *F02D 2200/602* (2013.01); *F16H 63/50* (2013.01); *G05B 17/02* (2013.01)

(58) Field of Classification Search
CPC ..... Y02T 10/47; F02D 41/26; F02D 41/1497; F02D 41/045; F02D 2200/501; F02D 2200/602; F02D 2200/1004; F16H 63/50; G05B 17/02
USPC .......................... 701/101, 102, 103, 104, 105
See application file for complete search history.

(56) References Cited

U.S. PATENT DOCUMENTS

| | | |
|---|---|---|
| 5,377,112 A | 12/1994 | Brown, Jr. et al. |
| 7,020,595 B1 | 3/2006 | Adibhatla et al. |
| 8,117,017 B2 | 2/2012 | Ellis et al. |
| 9,500,149 B2 | 11/2016 | Son et al. |
| 2010/0075802 A1* | 3/2010 | Gillanders .......... F02D 41/0255 477/98 |
| 2016/0252020 A1* | 9/2016 | Takahashi ............... F02D 23/02 701/105 |

FOREIGN PATENT DOCUMENTS

| | | |
|---|---|---|
| DE | 102009052226 A1 | 5/2011 |
| JP | 04356072 B2 | 5/2011 |

* cited by examiner

*Primary Examiner* — Sizo B Vilakazi
(74) *Attorney, Agent, or Firm* — Lee & Hayes, PLLC

(57) ABSTRACT

A system for estimating engine performance is configured to receive, via a cylinder combustion model, a cylinder pressure of a cylinder associated with operation of an internal combustion engine. The system estimates a liner bending moment based at least in part on the cylinder pressure, generates a piston side load associated with the cylinder based at least in part on the liner bending moment, and estimates a piston friction value for a piston associated with the cylinder. The piston friction value may be based at least in part on the cylinder pressure and an engine speed of the internal combustion engine. The system receives, via a convective heat transfer model, an exhaust heat transfer value indicative of a cumulative heat transfer from an exhaust manifold, and estimates an engine torque value based at least in part on the exhaust heat transfer value.

20 Claims, 8 Drawing Sheets

SYSTEM AND METHOD FOR ESTIMATING ENGINE PERFORMANCE

TECHNICAL FIELD

The present disclosure relates to a system for estimating engine performance, and more particularly, to a system and method for estimating engine performance associated with operation of an internal combustion engine.

BACKGROUND

Internal combustion engines combust fuel and air to produce power. Fuel efficiency and reducing emissions resulting from combustion have become more important in view of regulatory changes related to fuel efficiency standards and reducing emissions. As a result, it has become desirable to increase fuel efficiency and reduce emissions associated with operation of internal combustions engines. More precise control of operation of internal combustion engines enables achievement of higher fuel efficiency and reduced emissions. Such control often relies at least in part on measurement and/or calculation of different parameters involved with operation of the internal combustion engine. Physical sensors may provide a number of such measurements. Physical sensors may be unable to provide sufficient accuracy and/or responses to dynamically changing conditions of an internal combustion. Moreover, in many instances, it may not be possible for physical sensors to measure certain parameters, such as, for example, parameters related to conditions inside a cylinder of the internal combustion engine during operation. In other aspects, it may be impractical to utilize physical sensors in some areas of the engine due to physical conditions that may degrade the sensors, such as within a turbocharger, or within an exhaust manifold. Thus, physical sensors may be incapable of providing certain information related to operation of the internal combustion engine, or at least with a desired level of accuracy.

An attempt to perform model-based diagnostics is described in U.S. Pat. No. 7,020,595 B1 to Adibhatla ("the '595 patent"), published Mar. 28, 2006. Specifically, the '595 patent describes a system for module-based diagnostics that inputs sensor values into an engine component quality estimator to generate performance estimates for diagnosing engine conditions such as stall margins and fuel consumption, and monitoring engine efficiencies related to the fan, compressor, and turbine of the engine. The engine component quality estimator described in the '595 patent uses regression or system identification techniques to produce performance estimates of some rotating components of the engine.

Although the '595 patent purports to provide a diagnostics system, the method of the '595 patent may not render results having a desired accuracy and may not be effective for some engine types. The systems and methods disclosed herein may be directed to mitigating or overcoming one or more of the possible drawbacks set forth above.

SUMMARY

According to a first aspect, a computer-implemented method for estimating engine torque may include receiving, via a cylinder combustion model, a cylinder pressure of a cylinder associated with operation of an internal combustion engine. The method may include estimating a piston side load based at least in part on the cylinder pressure, and estimating a piston friction value for a piston associated with the cylinder. The piston friction value may be based at least in part on the cylinder pressure and an engine speed of the internal combustion engine. The method may also include receiving, via a convective heat transfer model, an exhaust heat transfer value indicative of a cumulative heat transfer from an exhaust manifold, and estimating an engine torque value associated with operation of the internal combustion engine based at least in part on the exhaust heat transfer value.

According to a further aspect, a computer-readable storage medium may include computer-executable instructions stored thereupon which, when executed by a computer, may cause the computer to perform one or more acts. The acts may include receiving, via a cylinder combustion model, a cylinder pressure of a cylinder associated with operation of an internal combustion engine. The acts may also include estimating a piston side load based at least in part on the cylinder pressure, and estimating a piston friction value for a piston associated with the cylinder. The piston friction value may be based at least in part on the cylinder pressure and an engine speed of the internal combustion engine. The acts may further include receiving, via a convective heat transfer model, an exhaust heat transfer value indicative of a cumulative heat transfer from an exhaust manifold, and estimating an engine torque value associated with operation of the internal combustion engine based at least in part on the exhaust heat transfer value.

According to another aspect, a system for estimating engine torque may include at least one processor configured to receive, via a cylinder combustion model, a cylinder pressure of a cylinder associated with operation of an internal combustion engine. The at least one processor may also be configured to estimate a piston side load based at least in part on the cylinder pressure, and estimate a piston friction value for a piston associated with the cylinder. The piston friction value may be based at least in part on the cylinder pressure and an engine speed of the internal combustion engine. The at least one processor may also be configured to receive, via a convective heat transfer model, an exhaust heat transfer value indicative of a cumulative heat transfer from an exhaust manifold, and estimate an engine torque value associated with operation of the internal combustion engine based at least in part on the exhaust heat transfer value.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
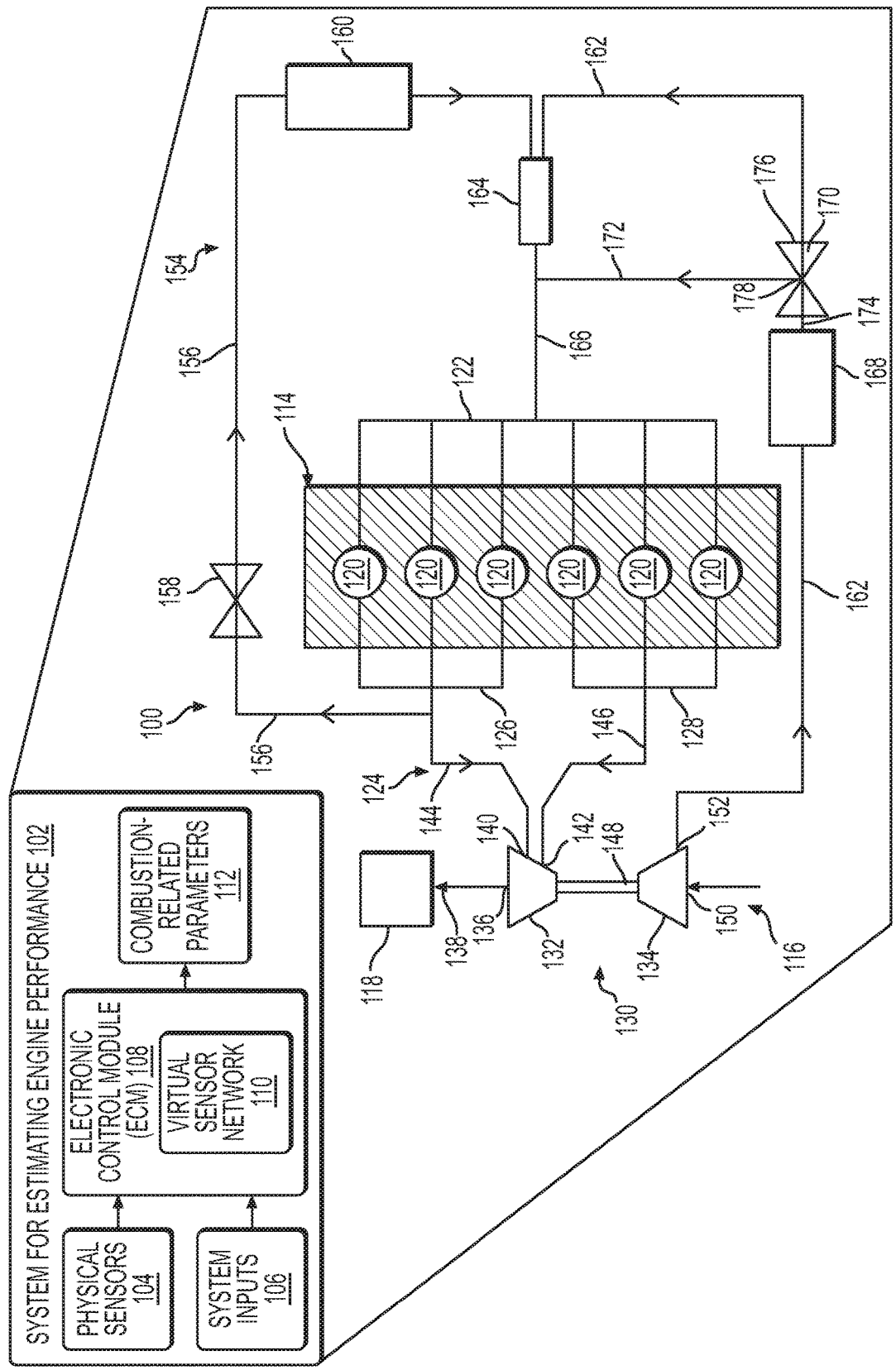
FIG. 1 is a schematic view of an example internal combustion engine and an example system for estimating engine performance.

FIG. 1 schematically depicts an example internal combustion engine 100 and an example system for estimating exhaust manifold temperature 102 associated with operation of example internal combustion engine 100. Example internal combustion engine 100 is merely an example, and may be a compression-ignition engine, a spark-ignition engine, a homogeneous-charge compression ignition engine, a two-stroke engine, a four-stroke, a six-stroke engine, or any type of internal combustion engine known to those skilled in the art. In some examples, as explained herein, system for estimating exhaust manifold temperature 102 may be configured to receive and/or generate one or more signals from one or more physical sensor(s) 104 and/or receive and/or generate one or more system inputs 106 (e.g., data related to the structure of internal combustion engine 100), for example, at an electronic control module (ECM) 108, which in some examples may include a virtual sensor network 110. ECM 108 may, in turn, estimate one or more combustion-related parameters 112 (e.g., exhaust manifold temperature, peak cylinder pressure, etc.) associated with combustion occurring in one or more cylinders of internal combustion engine 100 using, at least in part, virtual sensor network 110.

As schematically depicted in FIG. 1, example internal combustion engine 100 may include a single cylinder bank 114, a turbocharger system 116, and an exhaust aftertreatment system 118. Although a single cylinder bank 114 is shown, it is contemplated that internal combustion engine 100 may include multiple cylinder banks. Example cylinder bank 114 may include six cylinders for combustion. It is contemplated that cylinder bank 114 may include fewer cylinders (e.g., one, two, three, four, five cylinders) or more cylinders (e.g., 8, 10, 12, or 16, etc., cylinders). In some examples, one or more cylinders 120 of cylinder bank 114 may be coupled to one or more intake manifolds 122 and one or more exhaust manifolds 124. Intake manifold 122 may be in flow communication with cylinder 120 for providing an air-fuel mixture to one or more cylinder 120 for combustion. A fuel, such as, for example, diesel fuel, gasoline, alcohol, natural gas, mixtures thereof, and/or any known suitable fuel may be injected into cylinder 120 and combusted therein, for example, in a known manner. Although generally described herein as compression ignition engine, in other examples, engine 100 may be a spark ignited engine where the fuel is introduced through intake manifold 122 and not injected directly into cylinder 120.

Example internal combustion engine 100 may include a first exhaust manifold 126 and a second exhaust manifold 128. In one example system, first exhaust manifold 126 may be in flow communication with three other cylinders 120, and second exhaust manifold 128 may be in flow communication with three cylinders. Example internal combustion engine 100 is depicted as a split-manifold system. Other manifold configurations are contemplated, such as, for example one or more exhaust manifolds that combine to a single turbocharger, or manifolds having separate turbochargers for each bank. Example turbocharger system 116 includes a turbocharger 130 having a turbine 132 and a compressor 134. Example turbine 132 may include a turbine outlet 136 in flow communication with an inlet 138 to exhaust aftertreatment system 118, a first inlet path 140 in flow communication with first exhaust manifold 126 and a second inlet path 142 in flow communication with second exhaust manifold 128. A first conduit 144 may provide flow communication between first exhaust manifold 126 and first inlet path 140, and a second conduit 146 may provide flow communication between second exhaust manifold 128 and second inlet path 142. In some examples, a turbine wheel (not shown) of turbine 132, and a compressor wheel (not shown) of compressor 134 may be coupled to one another by a shaft 148, which causes the turbine wheel and compressor wheel to rotate with one another. In some example configurations, compressor 134 may include a compressor inlet 150 and a compressor outlet 152. Compressor inlet 150 is configured to receive a compressible medium (e.g., such as ambient air) and compress the compressible medium. Compressor outlet 152 supplies the compressed medium to intake manifold 122, so that it may be used for combustion in one or more cylinders 120.

The example internal combustion engine 100 shown in FIG. 1 may also include an exhaust gas recirculation (EGR) system 154. In the example shown, internal combustion engine 100 includes a conduit 156 configured to receiving exhaust gas from first exhaust manifold 126 and direct the exhaust gas to intake manifold 122. Example conduit 156 may be in flow communication with first conduit 144, which may include a valve 158 for controlling the flow of exhaust gas through conduit 156. Some examples may include a cooler 160 associated with conduit 156, for example, to lower the temperature of exhaust gas provided to intake manifold 122. A conduit 162 may be in flow communication with compressor outlet 152 and a mixer 164. Mixer 164 may, in some examples, also receive exhaust gas flow from conduit 156, and may be configured to control the mixture of compressed combustion gas received from compressor 134 with exhaust gas recirculated from EGR system 154, and may provide the mixture thereof to intake manifold 122 through a conduit 166.

Example internal combustion engine 100 may also include an aftercooler 168 and a valve 170 in conduit 162, and example valve 170 may be configured to direct compressed media (e.g., compressed gas) to mixer 164 via conduit 162 or through a conduit 172 directly to conduit 166, thereby bypassing mixer 164. In some examples, valve 170 may include an inlet 174 in flow communication with conduit 162, and may receive compressed media (e.g., combustion gas) from compressor 134. In some examples, valve 170 may further include a first outlet 176 in flow communication with conduit 162, for directing compressed media (e.g., combustion gas) to mixer 164, and a second outlet 178 in flow communication with conduit 172.

During example operation, a fuel, such as, for example, diesel fuel, may be injected according to a firing order into cylinders 120 and combusted when a piston disposed within cylinder 120 is at or near a top-dead-center position in the respective cylinder. Exhaust gas generated during combustion is permitted to flow (e.g., via opening of an exhaust valve) from a respective cylinder (e.g., cylinder 120) to an associated exhaust manifold 124 (e.g., either first exhaust manifold 126 or second exhaust manifold 128). Exhaust gas within first exhaust manifold 126 is permitted to flow to first inlet path 140, and exhaust gas from second exhaust manifold 128 is permitted to flow to second inlet path 142, which rotatably drives a turbine wheel (not shown) of turbine 132. In some examples, turbine 132, in turn, may rotatably drive compressor 134 via shaft 148. Thereafter, the exhaust gas may be discharged from turbine 132 to exhaust aftertreatment system 118 via turbine outlet 136.

For example, as shown in FIG. 1, exhaust gas may be recirculated from first exhaust manifold 126 to intake manifold 122 via conduit 156, mixer 164, and conduit 166. Compressor 134 draws combustion media (e.g., air) into compressor inlet 150. The media is compressed in compressor 134 and is discharged from compressor 134 via compressor outlet 152 and conduit 162. The compressed combustion media may be cooled as is passes through aftercooler 168 and is permitted to flow to intake manifold 122, for example, via mixer 164 and conduit 166 for use in combustion occurring within cylinders 120. In some examples, mixer 164 may be configured to combine fluid flow from conduit 156 of EGR system 154 and from conduit 162 and supply the mixture to intake manifold 122 via conduit 166. In some examples, valve 170 may be configured to selectively allow bypassing at least some of the compressed gas flow in conduit 162 to conduit 166 and intake manifold 122, bypassing mixer 164. In some examples, EGR flow rate in conduit 156 may be controlled by, for example, valve 158.

Figure 2:
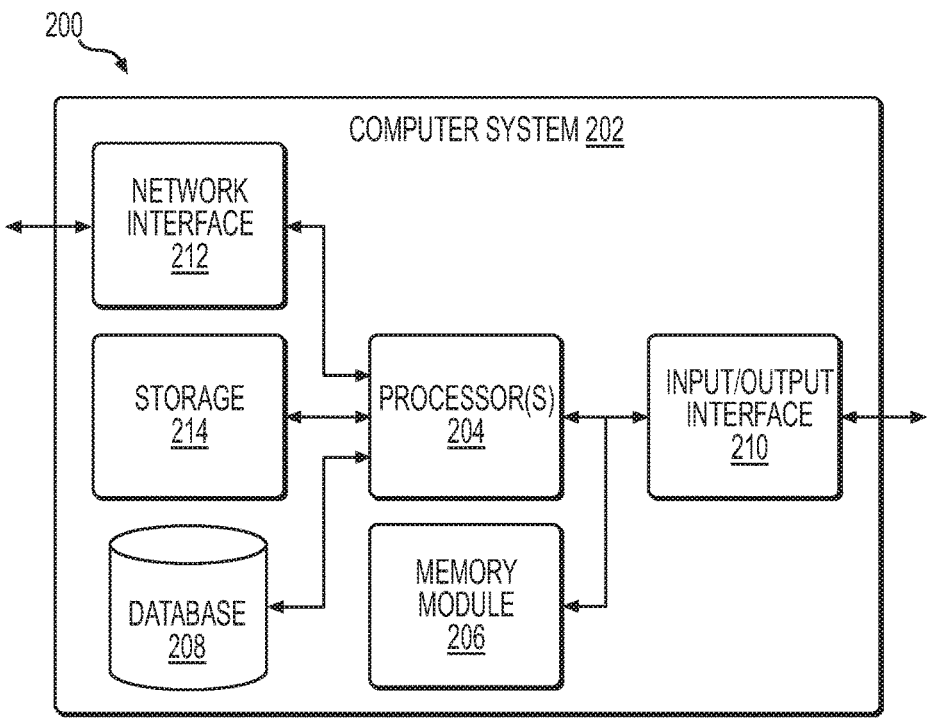
FIG. 2 is a block diagram of an example architecture for an example computer system consistent with example systems and methods described herein.

FIG. 2 is a block diagram of an example architecture 200 for an example computer system 202 consistent with example systems and methods described herein. As shown in FIG. 2, computer system 202 (e.g., which may execute virtual sensor network 110, etc., FIG. 1) may include one or more processor(s) 204, a memory module 206, a database 208, an input/output interface 210, a network interface 212, and/or storage 214. Computer system 202 may include additional and/or other components.

Example processor(s) 204 may include one or more of a microprocessor, digital signal processor, or microcontroller. In some examples, processor(s) 204 may be configured as a separate processor module dedicated to controlling operational aspects of internal combustion engine 100. Alternatively, or in addition, processor(s) 204 may be configured as a shared processor module for performing functions unrelated to virtual sensor network 110.

Memory module 206, in some examples, may include one or more memory devices including, but not limited to, a read-only memory (ROM), a flash memory, a dynamic random-access memory (RAM), and/or a static RAM. Memory module 206, in some examples, may be configured to store information, which may be used by processor(s) 204. In some examples, database 208 may include any type of appropriate database including information related to, for example, characteristics of measured parameters, sensing parameters, mathematical models and/or thermodynamic models, and/or any other information related to control and/or analysis of operation of internal combustion engine 100.

In addition, input/output interface 210 may be configured to receive data from various sensors (e.g., physical sensor(s) 104 and/or virtual sensors associated with virtual sensor network 110), and/or to transmit data to such components and/or to ECM 108, for example. Network interface 212, in some examples, may include any appropriate type of network device capable of communicating with other computer systems, for example, based on one or more wired or wireless communication protocols. In some examples, storage 214 may include any appropriate type of mass storage configured to store any type of information that processor(s) 204 may access for operation. For example, storage 214 may include one or more hard disk devices, optical disk devices, and/or other storage devices to provide storage space. Any of the components of example computer system 202 may be implemented and/or integrated into an application-specific-integrated-circuit (ASIC) and/or field-programmable-gate-array (FPGA) device.

Figure 3:
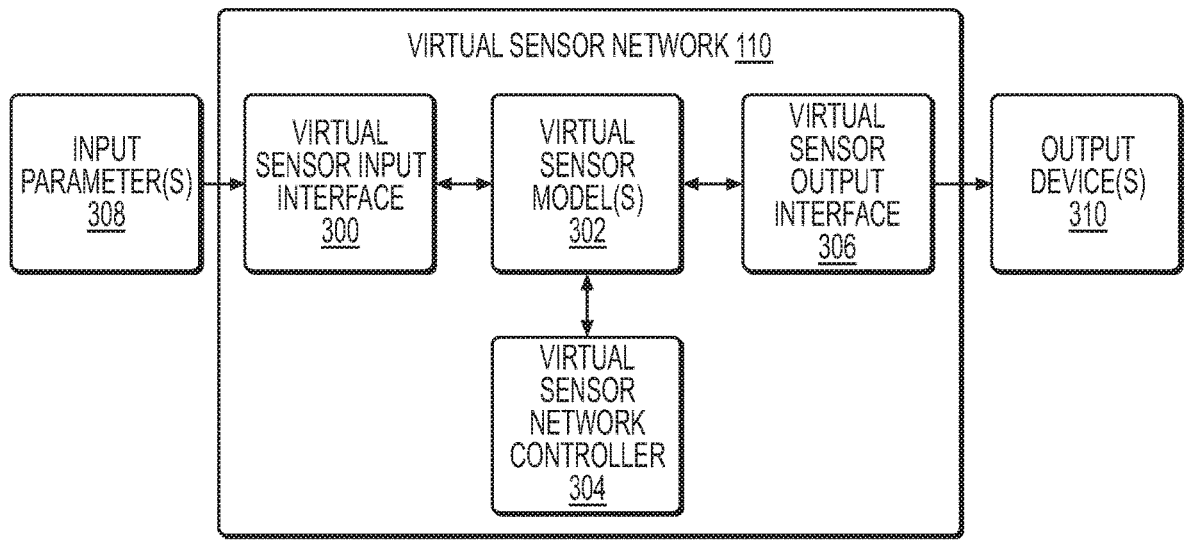
FIG. 3 is a block diagram of an example virtual sensor network and example output device.

FIG. 3 is a block diagram including an example virtual sensor network 110. As shown in FIG. 3, virtual sensor network 110 may include a virtual sensor input interface 300, one or more virtual sensor model(s) 302, a virtual sensor network controller 304, and/or a virtual sensor output interface 306. In some examples, one or more input parameter(s) 308 (e.g., one or more signals received from physical sensor(s) 104 and/or system inputs 106 (FIG. 1)) may be received by virtual sensor input interface 300, and virtual sensor output interface 306 may be in communication with one or more output device(s) 310 for providing one or more combustion-related parameters, for example, as described herein. Output device(s) 310 may be configured to display information related to the one or more combustion-related parameters and/or other information, either directly (e.g., as schematically depicted by the arrow) or via the one or more networks. For example, the combustion-related parameters may be communicated directly via a hard-wired connection to output device(s) 310, which may be an integral part of a device associated with one or more processors (e.g., processor(s) 204), may be located in the same general vicinity as the one or more processors (e.g., in the same room or the same building), or may be located remotely from the one or more processors, but in communication via a hard-wired connection.

In some examples, output device(s) 310 may include a hand-held device configured to be carried by a person. For example, output device(s) 310 may include any computer device including a transceiver for sending and receiving signals, for example, via one or more networks. For example, output device(s) 310 may include a user interface configured to display a representation of the combustion-related parameters. In some examples, the combustion-related parameters may be communicated, either directly or via the one or more networks, to an output device at a service center. The service center may be, for example, a location at which the condition, operation, and/or maintenance of internal combustion engine 100 may be monitored, or at which service and/or maintenance of internal combustion engine 100 may be performed. In one example, the service center may be associated with the manufacturer of internal combustion engine 100 and/or a machine associated with internal combustion engine 100, and/or a location associated with a third party responsible for fulfilling a service and/or maintenance contract associated with internal combustion engine 100.

Virtual sensor network 110 may refer to one or more virtual sensor model(s) 302 integrated as a collection of virtual sensors to provide sensing functionalities under a central control unit. Virtual sensor network 110, in some examples, may not be a simple or mechanical aggregation of multiple virtual sensor model(s) 302. Virtual sensor model(s) 302 in virtual sensor network 110 may, in some examples, be integrated to operate with a particular system.

In some examples, virtual sensor input interface 300 may include any appropriate interface, such as an input/output interface and/or a data link, etc., configured to obtain information (e.g., via one or more sensor signals) from various physical sensors (e.g., physical sensor(s) 104 shown in FIG. 1). Such information may include, for example, values associated with input parameters and/or control parameters of physical sensor(s) 104, operational status of the physical sensor(s) 104, and/or values of output parameters associated with physical sensor(s) 104. Such information may be provided to virtual sensor input interface 300 as input parameter(s) 308.

Input parameter(s) 308 may include signals from physical sensor(s) 104 such as, for example, one or more signals indicative of fuel supplied to a cylinder of an internal combustion engine (e.g., internal combustion engine 100), and/or a signal indicative of air flow inputs to cylinder 120. Examples of signals indicative of fuel inputs may include, for example, a fuel volume, a fuel flow rate, a fuel type (e.g., diesel, gasoline, ethanol, etc.), one or more values indicative of a fuel mixture (e.g., a proportion of total volume of fuel A with respect to fuel B), and other signals. Examples of signals indicative of air flow inputs may include a mass flow rate for air or another combustion medium (e.g., a mass air flow rate supplied to or received from internal combustion engine 100), air pressure (e.g., an air intake manifold air pressure, compressed and/or uncompressed exhaust gas pressure, compressed and/or uncompressed combustion air pressure, etc.), a signal indicative of air temperature (e.g., an intake manifold air temperature, ambient air temperature, etc.), and other similar inputs. It may be appreciated that physical sensor(s) 104 may include any one or more types of sensors not explicitly listed herein. It may also be appreciated that one or more of input parameter(s) 308 may additionally or alternatively be provided by one or more virtual sensors of virtual sensor network 110.

Virtual sensor output interface 306, in some examples, may include any appropriate interface, such as an input/output interface, and/or an ECM/xPC interface, etc., configured to provide information from virtual sensor model(s) 302 and virtual sensor network controller 304 to external systems, such as ECM 108, and/or to an external user of virtual sensor network 110. The information may be provided to external systems and/or users (e.g., via output device(s) 310) as one or more combustion-related parameters 112.

Virtual sensor model(s) 302 may include a plurality of virtual sensors, such as virtual emission sensors, virtual fuel sensors, and virtual speed sensors, etc. Any virtual sensor may be included in virtual sensor model(s) 302. In some examples, virtual sensor model(s) 302 may leverage a certain amount of computational resource for operation. For example, a virtual sensor model may leverage storage in a certain amount of memory. The program code and data associated with the virtual sensor model may be loaded into memory (e.g., memory module 206, database 208, etc.) to be executed by one or more processors (e.g., processor(s) 204). Execution of the virtual sensor model may leverage a certain amount of processing time of the one or more processors. Other computational resources, such as input/output operations, display operations, etc., may also be leveraged by one or more virtual sensor model(s) 302. Virtual sensor model(s) 302 may include virtual sensing mechanisms configured to estimate values that include (and/or may be used to estimate) exhaust heat transfer rate(s), exhaust manifold temperature(s), turbine inlet gas temperature(s), exhaust port temperature(s), piston side load values, bending moment(s), friction mean effective pressure(s), friction energy estimate(s), etc. Other examples of virtual sensor model(s) 302 may include sensors that estimate values that include (and/or may be used to estimate) pumping mean-effective pressure(s) (PMEPs), volume(s) of mass media flow (e.g., exhaust gas flow, air flow, etc.), and/or the like.

The overall computational resources used by a virtual sensor model may be referred to as a "footprint" of the virtual sensor model. The size of the footprint, such as, the overall amount of computational resources, may relate to the complexity of the virtual sensor model, the type of the virtual sensor model, and/or the accuracy of the virtual sensor model. A footprint of a virtual sensor network may include footprints of virtual models in virtual sensor network 110, in addition to a certain amount of computational resources used by certain virtual sensor network functionalities, such as, for example, control and/or validation functions. The plurality of virtual sensors may be integrated into virtual sensor model(s) 302 of virtual sensor network 110 by, for example, computer system 202, such that the footprint for virtual sensor network 110 may be desired or optimized.

Figure 4:
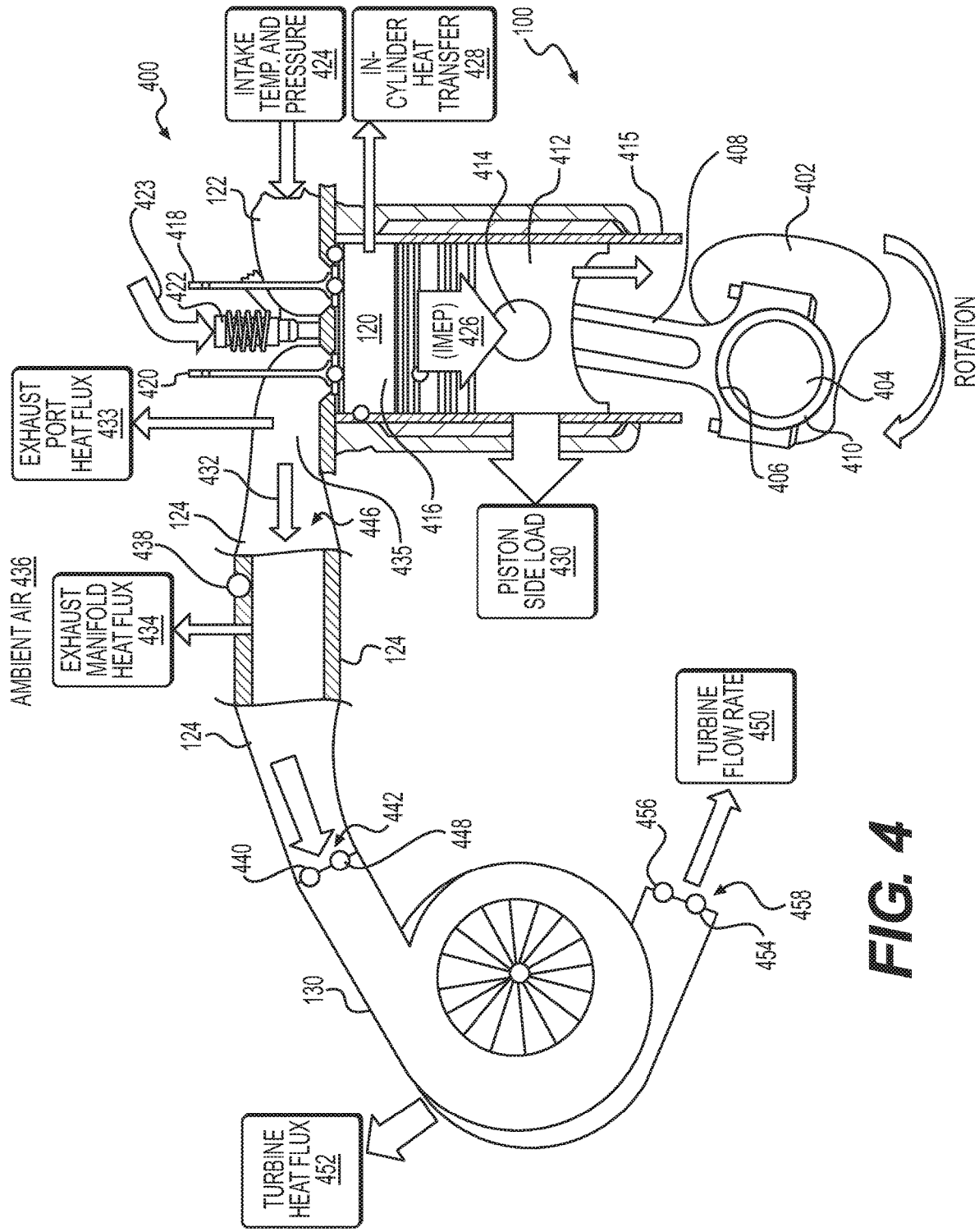
FIG. 4 is a schematic side view of an example combustion cylinder of an example internal combustion engine, an example turbocharger, and an example exhaust manifold providing flow communication between the turbocharger and the internal combustion engine.

FIG. 4 is a schematic side view of an example cylinder and exhaust system 400 of an example internal combustion engine, which may correspond to example internal combustion engine 100 show in FIG. 1, during an example power stroke during which combustion occurs in example cylinder 120 of cylinder bank 114. FIG. 4 shows example cylinder 120 and related components such as, for example, exhaust manifold 124 providing flow communication between turbocharger 130 and cylinder 120. Cylinder 120, exhaust manifold 124, and turbocharger 130 are depicted for the purpose of description. Additional and/or different configurations of system components are contemplated.

Cylinder and exhaust system 400 may include a crankshaft 402 rotatably supported in cylinder bank 114 (FIG. 1), for example, via one or more bearings 410 coupled to cylinder bank 114 and portions of crankshaft 402. Example crankshaft 402 may include a crankpin 404, about which an aperture 406 in a connecting rod 408 may be coupled, and which rotates on bearings 410 within aperture 406 of connecting rod 408, as crankshaft 402 rotates though three-hundred-sixty degrees. An end of connecting rod 408 opposite crankpin 404 may be rotatably coupled to a piston 412 via crankpin 404. Example cylinder 120 shown in FIG. 4 includes an example cylinder liner 415 within which piston 414 slides and reciprocates during operation of internal combustion engine 100. In the example shown, example cylinder 120 and example piston 412 define a combustion chamber 416 that expands and contracts as piston 412 reciprocates within cylinder 120.

Example cylinder and exhaust system 400 may also include an intake valve 418 configured to open and provide flow communication with combustion chamber 416 and permit air for combustion to enter combustion chamber 416 via intake manifold 122 and to close to substantially seal combustion chamber 416. Example cylinder and exhaust system 400 may also include an exhaust valve 420 configured to open and provide flow communication between combustion chamber 416 and exhaust manifold 124 and to permit combusted air and fuel following combustion to enter exhaust manifold 124, and to close to substantially seal combustion chamber 416. Example cylinder and exhaust system 400 may, in some examples configured as a compression-ignition system, include a fuel injector 422 configured to selectively supply fuel 423 to combustion chamber 416, for example, in a substantially atomized form to promote even and/or efficient combustion. In other examples configured as a spark-ignition system, the fuel supply may be timed differently.

During operation, according to some examples, piston 412 may travel down cylinder 120 (e.g., away from intake valve 418) during an intake stroke, while intake valve 418 may be at least partially open and exhaust valve 420 may be substantially closed (e.g., but not necessarily completely closed), drawing air into combustion chamber 416 at an intake temperature and intake pressure 424 while crankshaft 402 rotates. When piston 412 reaches its lowest point of travel down cylinder 120, intake valve 418 may close, and a compression stroke may begin as piston 412 reverses direction and travels within cylinder 120 back toward intake valve 418, increasing the pressure in combustion chamber 416. In some examples, fuel injector 422 may activate and supply fuel 423 to combustion chamber 416 as piston 412 reaches the top end of its stroke and/or shortly thereafter. In some examples (e.g., when cylinder and exhaust system 400 is part of a compression-ignition engine), the temperature and/or pressure in combustion chamber 416 will cause a mixture of fuel 423 and air supplied to combustion chamber 416 to ignite and combust, with intake valve 418 and exhaust valve 420 closed (or substantially closed), substantially commencing a power stroke, during which piston 412 is forced under pressure in combustion chamber 416 away from intake valve 418, thereby driving crankshaft 402 to rotate via its connection to crankpin 404 of connecting rod 408. After piston 412 reaches the end of its downward stroke (e.g., in the orientation shown), exhaust valve 420 may open, providing flow communication between combustion chamber 416 and exhaust manifold 124. As piston 412 travels toward exhaust valve 420 during an exhaust stroke, exhaust energy 432 (e.g., heat, pressure, combustion by-products, etc.) are pushed to exhaust manifold 124 through an exhaust port 435. This example cycle may be repeated, thereby generating power.

FIG. 4 shows an example partially completed power stroke, during which combustion occurs in cylinder 120. Once combustion commences, piston 412 is subjected to increasing temperature and pressure due to combustion. Indicated mean effective pressure (IMEP) 426 is reflective of the net work done on piston 412 by fuel 423 in combustion chamber 416. As the temperature and pressure increase, in-cylinder heat transfer 428 occurs, transferring heat through cylinder liner 415 and into cylinder bank 114 (FIG. 1). Piston 412 may be subjected to a piston side load 430. As exhaust valve 420 opens during the exhaust stroke, with piston 412 travelling back toward exhaust valve 420, exhaust energy 432 (e.g., heat, pressure, combustion by-products, etc.) may be expelled, at least in part, through exhaust manifold 124.

Exhaust gas may flow through exhaust port 435 to exhaust manifold 124, and exchange thermal energy with ambient air 436 through surfaces of exhaust port 435 and exhaust manifold 124. There may be heat flow between the exhaust gas in the manifold and the manifold iron, and thus, the exhaust gas in the manifold may exchange thermal energy with a heat sink medium in thermal communication with exhaust manifold 124. In one example, the heat sink medium may be ambient air 436. In another example, the heat sink medium may be water, air, oil, and/or another medium. For example, some thermal energy may transfer from the exhaust gas to ambient air 436 via exhaust port 435 at an estimated heat transfer rate depicted as exhaust port heat flux 433. In an example system that includes a water-cooled manifold (not shown), exhaust energy 432 may also exchange with jacket water (not shown). Similarly, some thermal energy may transfer from the exhaust gas to ambient air 436 via exhaust manifold 124 at an estimated heat transfer rate depicted as exhaust manifold heat flux 434. Exhaust manifold heat flux 434 and exhaust port heat flux 435 may change with time during operation of internal combustion engine 100. In an example operation, the ECM 108 may determine the dynamically-changing heat transfer rates based at least in part on a predetermined convection heat coefficient associated with the exhaust manifold 124, exhaust port 435, and other information provided by one or more virtual sensor(s) of the virtual sensor network 110 and/or one or more physical sensor(s) 104 associated with internal combustion engine 100.

As described hereafter in greater detail, computer system 202 may estimate an exhaust manifold temperature 438 and value indicative of a rate of temperature change for the exhaust manifold 124 as heat energy transfer associated with the exhaust manifold heat flux 434 occurs over time with ambient air 436. Computer system 202 may also apply an energy balance model and/or convective heat transfer model 712 to estimate turbine inlet exhaust gas temperature 440 at a turbine inlet 442 of turbocharger 130, and/or exhaust manifold inlet gas temperature 444 at an exhaust manifold inlet 446 (which may correspond to and/or be the same as one or more of first inlet path 142 and/or second inlet path 142 (FIG. 1)). As described in greater detail with respect to FIGS. 5-9, computer system 202 may determine one or more combustion-related parameters including, for example, an estimated turbine inlet exhaust gas pressure 448, a turbine outlet temperature 454, and/or a turbine outlet pressure 456 at a turbine outlet 458, and evaluate heat transfer associated with exhaust gas passing through turbocharger 130 (e.g., a turbine heat flux 452 and a turbine flow rate 450).

Figure 5:
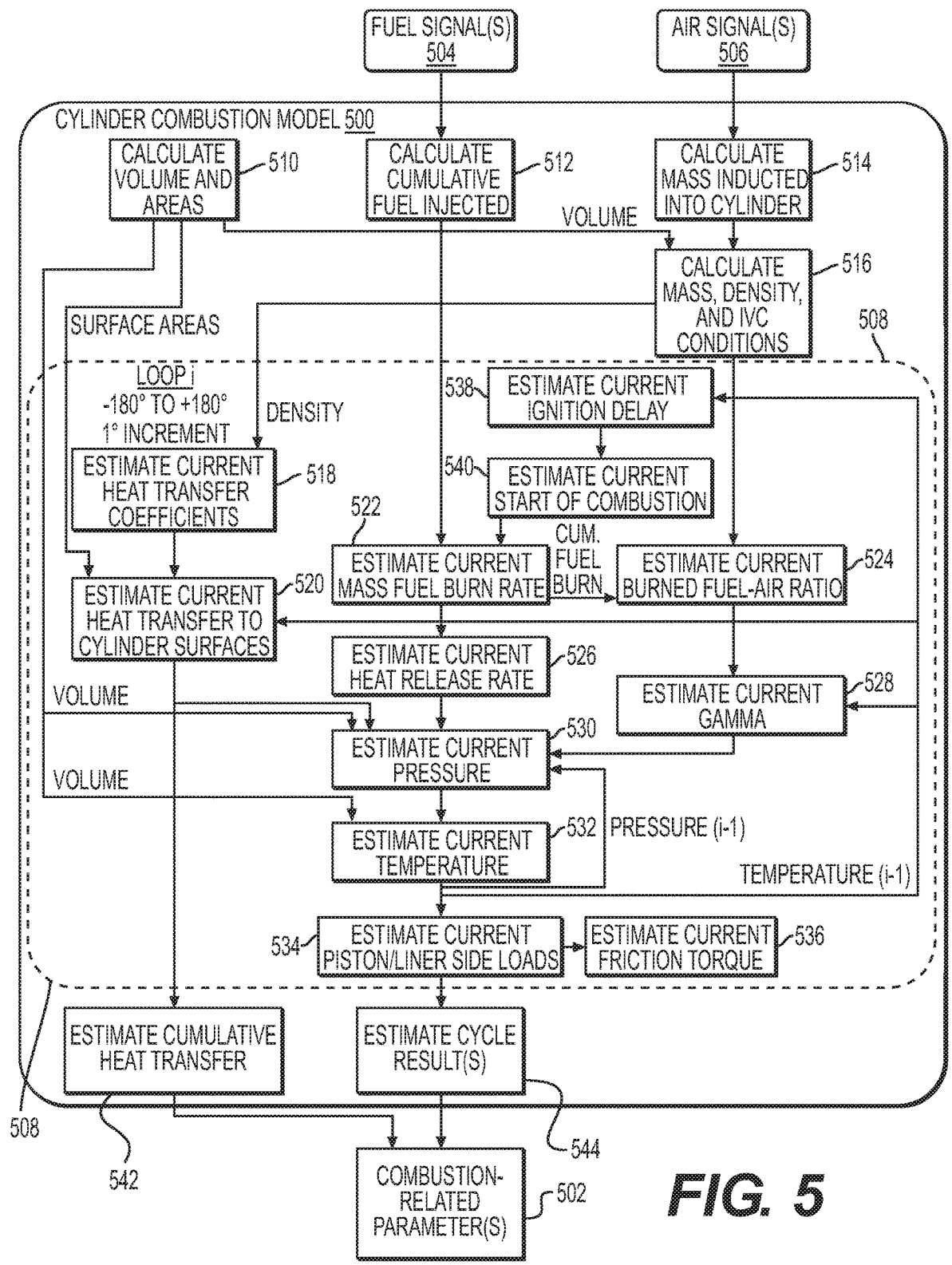
FIG. 5 is a flowchart of an example cylinder combustion model for estimating combustion-related parameters associated with example combustion in an example cylinder of an example internal combustion engine.

FIG. 5 is a flowchart of an example cylinder combustion model 500 for estimating one or more combustion-related parameters 502. Cylinder combustion model 500 may be associated with combustion in an example cylinder of an example internal combustion engine, which may correspond to cylinder 120 of internal combustion engine 100 (FIG. 1). For example, cylinder combustion model 500 may be configured to receive at least one of one or more fuel signal(s) 504 indicative of an amount of fuel supplied to cylinder 120 (e.g., fuel 423, FIG. 4), and one or more air signal(s) 506 indicative of a quantity of air supplied to cylinder 120. In some examples, cylinder combustion model 500 may be configured to dynamically estimate a plurality of combustion-related parameters 502 associated with combustion in cylinder 120, as explained herein. In some examples, cylinder combustion model 500 may be configured to also receive system inputs 106 (see, e.g., FIG. 1), which may be indicative of dimensions and/or related information associated with one or more of cylinder 120, piston 412, connecting rod 408, crankshaft 402, an offset of crankpin 404, and/or any related components of internal combustion engine 100. Examples of fuel signal(s) 504 may include a volume of fuel, a flow rate of fuel supplied to cylinder 120, a fuel type (e.g., compression ignition engine, gasoline, ethanol, etc.), a fuel mixture (e.g., a proportion of total volume of a first fuel type with respect to a total volume of a second fuel type), etc. In other aspects, internal combustion engine 100 may be configured as a spark-ignited engine or a dual gas blending (DBG) engine, where air and fuel may be combined within intake valve 418.

Examples of air signal(s) 506 may include a mass flow rate for air or another combustion medium (e.g., a mass air flow rate supplied to or received from internal combustion engine 100), a pressure value for compressed and/or uncompressed exhaust gas, a pressure value for compressed and/or uncompressed combustion air, an air temperature (e.g., an intake manifold air temperature, ambient air temperature, etc.), and/or other similar inputs. Fuel signal(s) 504 and air signal(s) 506 may include any combination of virtual sensor data from virtual sensor model(s) 302 and/or data from physical sensor(s) 104.

As shown in FIG. 5, example cylinder combustion model 500 may be configured to estimate combustion-related parameters 502 associated with discrete angles of crankshaft 402, as crankshaft 402 rotates from an orientation of minus-180 degrees to an orientation of plus-180 degrees, which may correspond to a compression stroke (e.g., from minus-180 degrees to 0 degrees (e.g., top-dead-center of the travel of piston 412 in cylinder 120)) and a power stroke (e.g., from 0 degrees to plus-180 degrees). For example, cylinder combustion model 500 shown in FIG. 5 may include an incrementing model 508 configured to perform a sequential series of estimations for a given crankshaft angle, and upon completion of the estimations for the given crankshaft angle, increment the crankshaft angle by an incremental step (i) to an incremented crankshaft angle. Cylinder combustion model 500 may perform the sequential series of estimations for the incremented crankshaft angle. The incremental step (i) may, in some examples, have a constant magnitude (e.g., one, two, three, etc., degree(s)), or may have a variable magnitude that changes depending on the orientation of crankshaft 402. For example, for some portions of the compression stroke and/or power stroke, it may be desirable to reduce the magnitude of the increment (e.g., to less than one degree) in order to obtain a greater number of data points for portions of the compression stroke and/or the power stroke that are more complex or are of greater interest. For example, it may be advantageous to obtain a greater number of data points around top-dead-center of the stroke of piston 412. In other portions of the compression stroke and/or power stroke, the magnitude of the increment may be greater than one degree due to a lower relative complexity and/or less interest in the corresponding crankshaft angles. For example, the magnitude of the increment may be greater than one degree around a position of piston 412 at bottom-dead-center (e.g., the lowest point of travel of piston 412 in cylinder 120).

As explained herein, after performing a series of sequential estimations by incrementing model 508 for a given range of crankshaft orientations (e.g., minus-180 degrees through plus-180 degrees), cylinder combustion model 500 may estimate any number of cumulative combustion-related parameters (e.g., including combustion-related parameters 502). Thus, in some examples, when instantiated by processor(s) 204, cylinder combustion model 500 may be configured to receive one or more of system inputs 106, fuel signal(s) 504, or air signal(s) 506, and estimate combustion-related parameters using incrementing model 508 for a plurality of crankshaft orientations associated with a range of angles through which crankshaft 402 rotates (e.g., throughout angles associated with a combustion event), and use those estimations to estimate cumulative combustion-related parameters associated with at least a portion of the range of angles. For example, cylinder combustion model 500 may estimate one or more parameters that may include a cumulative heat transfer associated with the combustion event, an indicated mean-effective pressure (IMEP), a cylinder pressure, a friction mean-effective pressure (FMEP), a maximum piston side load, a maximum cylinder liner bending moment, a gross indicated mean-effective pressure (GIMEP), one or more characteristics of heat flux to cylinder surfaces, a total in-cylinder heat transfer, a friction energy to piston 412 and bearings 410, etc.

As shown in FIG. 5, example cylinder combustion model 500 may include a plurality of modules and/or sub-models configured to calculate and/or estimate combustion-related parameters associated with a combustion event (e.g., a single combustion associated with a compression stroke and/or a power stroke of internal combustion engine 100). Unless otherwise noted herein, the modules and/or virtual sensor model(s) 302 may perform calculations in a manner consistent with calculations known to those skilled in the art of thermodynamics and/or combustion in internal combustion engines.

In the example cylinder combustion model 500 shown in FIG. 5, at 510, cylinder combustion model 500 may receive system inputs 106 and calculate volumes and/or areas (e.g., surface areas) associated with cylinder 120 and/or piston 412. Cylinder combustion model 500 may calculate the volumes and/or areas based on geometries associated with cylinder 120, piston 412, connecting rod 408, crankshaft 402, an offset of crankpin 404, exhaust manifold 124, and/or any related components of internal combustion engine 100. The volumes and/or areas may be used for further calculations and/or estimations, as described herein.

In the example shown, at 512, cylinder combustion model 500 may receive one or more fuel signal(s) 504 and calculate a cumulative value for fuel 423 (FIG. 4) injected during a combustion event. For example, fuel signal(s) 504 may include one or more signals from an electronic control module (e.g., ECM 108, FIG. 1), and/or one or more signals from one or more virtual sensors of virtual sensor network 110 and/or one or more physical sensors (e.g., physical sensor(s) 104). The one or more fuel signal(s) 504 may be indicative of the start of injection (SOI) and/or the end of injection (EIO), and based at least in part on such signals, calculate cumulative value for fuel 423 injected for the combustion event.

At 514, example cylinder combustion model 500, when instantiated by processor(s) 204, may cause processor(s) 204 to receive one or more air signal(s) 506, and calculate the mass of air inducted into cylinder 120 based at least in part on one or more air signal(s) 506. For example, one or more air signal(s) 506 may include one or more signals from one or more virtual sensor model(s) 302 of virtual sensor network 110 and/or one or more physical sensor(s) 104. One or more air signal(s) 506 may be indicative of, for example, total mass air flow, (e.g., from virtual sensor model(s) 302 and/or physical sensor(s) 104), EGR mass air flow (EMAF), intake manifold air Pressure (IMAP), and/or intake manifold air temperature (IMAT). Accordingly, cylinder combustion model 500 may be configured to calculate, via processor(s) 204, the total mass of air inducted into cylinder 120 for combustion. In some examples, the air inducted into cylinder 120 may be pressurized (e.g., via turbocharger 130 (FIGS. 1 and 4)), and may include ambient air and/or gases from exhaust aftertreatment system 118 and/or EGR system 154 (FIG. 1).

Example cylinder combustion model 500, at 516, may also calculate, based at least in part on a volume determined at 510 and/or the mass determined at 514, a mass value and/or a density value at the closing time value for intake valve 418.

In the example shown, cylinder combustion model 500 may use one or more of the determinations from 510, 512, and/or 514 as inputs for incrementing model 508. For example, at a first angle of crankshaft 402, incrementing model 508, at 518, may estimate current heat transfer coefficients (e.g., the heat transfer coefficients at the current crankshaft angle and/or at the time associated with the current crankshaft angle). Based at least in part on the determined current heat transfer coefficients at 518 and/or the surface area(s) determined at 510, at 520, cylinder combustion model 500 may be configured to estimate a current heat transfer to surfaces of cylinder 120.

At 522, cylinder combustion model 500 may be configured to estimate a current mass fuel burn rate (e.g., the mass fuel burn rate at the current crankshaft angle and/or at the time associated with the current crankshaft angle), based at least in part on the cumulative fuel injected determined at 512.

At 524, example cylinder combustion model 500 may be configured to estimate a current burned air-fuel ratio (e.g., the burned air-fuel ratio at the current crankshaft angle and/or at the time associated with the current crankshaft angle), based at least in part on the current mass fuel burn rate determined at 522 and/or the mass and/or density at the intake valve closing time determined at 516. The example cylinder combustion model 500, at 526, may be configured to estimate a current heat release rate (e.g., the heat release rate at the current crankshaft angle and/or at the time associated with the current crankshaft angle), based at least in part on the current mass fuel burn rate determined at 522.

At 528, example cylinder combustion model 500 may be configured to estimate a current gamma (e.g., a current ratio of specific heats, for example, the ratio of specific heats at the current crankshaft angle and/or at the time associated with the current crankshaft angle), based at least in part on current burned fuel-air ratio determined at 524.

At 530, example cylinder combustion model 500 may be configured to estimate a current pressure in cylinder 120 (e.g., the cylinder pressure at the current crankshaft angle and/or at the time associated with the current crankshaft angle), based at least in part on the volume determined at 510, the current heat transfer to the surfaces of cylinder 120, determined at 520, the current heat release rate determined at 526, and/or the current gamma determined at 528.

The example cylinder combustion model 500, at 532, may be configured to estimate a current temperature in cylinder 120 (e.g., the cylinder temperature at the current crankshaft angle and/or at the time associated with the current crankshaft angle), based at least in part on the volume determined at 510 and/or the current cylinder pressure determined at 530.

At 534, example cylinder combustion model 500 may be configured to estimate current piston/cylinder liner side loads (e.g., the piston/cylinder liner side loads at the current crankshaft angle and/or at the time associated with the current crankshaft angle) based at least in part on the current cylinder pressure determined at 530.

As shown in FIG. 5, at 536, cylinder combustion model 500 may be configured to estimate current friction torque (e.g., frictional losses due to torque from piston/cylinder liner side loads at the current crankshaft angle and/or at the time associated with the current crankshaft angle), based at least in part on the current piston/cylinder liner side loads determined at 534 and the cylinder pressure determined at 530.

As mentioned above, incrementing model 508, may in some examples, be configured to estimate combustion-related parameters at a series of crankshaft angles according to an incremental step, for example, a single degree of crankshaft movement (e.g., angular movement). For example, following the current cylinder temperature estimation at 532, at 538, example cylinder combustion model 500 may be configured to estimate a current ignition delay. At 540, the cylinder combustion model 500 may be configured to estimate a start of combustion based at least in part on the ignition delay determined at 538. For example, at any given crankshaft angle (or position), an ignition delay may be calculated using an empirical relationship based on the cylinder pressure and cylinder temperature. The ignition delay may be representative of the resulting delay if the pressure and temperature conditions were held constant. Since temperature and pressure may be changing at every timestep, the inverse of the ignition delay may be calculated, which may effectively convert it into an incremental measure of ignition progress. In some examples, the inverse of the ignition delay may thereafter be integrated over time to provide an ignition progress variable. In some examples, once the ignition progress variable exceeds a threshold value (e.g., 1, although other threshold values are contemplated), it may be presumed that ignition has occurred.

Thereafter, at 522, cylinder combustion model 500 may, at a second crankshaft angle following the first crankshaft angle, estimate the current mass fuel burn rate at the second crankshaft angle, based at least in part on the cumulative fuel injected determined at 512 and/or the estimated start of combustion determined at 540.

Thereafter, example cylinder combustion model 500 may be configured to estimate combustion-related parameters associated with the second crankshaft angle, for example, similar to the estimations at the first crankshaft angle at 524, 526, 528, 530, 532, 534, and/or 536. In some examples, the current cylinder temperature determined at 532 at the first crankshaft angle may be used as an input, for example, when estimating at the second crankshaft angle and/or at subsequent crankshaft angles, a current heat transfer to cylinder surfaces at 520, estimating a current gamma at 528, which, in turn, may be used to estimate, at 530, a current cylinder pressure at the second crankshaft angle and/or at subsequent crankshaft angles, and/or, at 532, a current cylinder pressure at the second crankshaft angle and/or at subsequent crankshaft angles. In some examples, cylinder combustion model 500 may use the current cylinder temperature determined for the second crankshaft angle and/or subsequent crankshaft angles, to estimate a current piston/cylinder liner side load at 534, and/or, to estimate the friction torque at the second crankshaft angle and/or subsequent crankshaft angles.

As noted above, example incrementing model 508 may serially estimate one or more of the combustion-related parameters at 520, 522, 524, 526, 528, 530, 532, 534, 536, 538, 540, and/or 542, for example, as crankshaft 402 rotates from minus-180 degrees to plus-180 degrees. As shown in FIG. 5, as incrementing model 508 determines additional values for the combustion-related parameters at different crankshaft angles, cylinder combustion model 500 may be configured, at 542, to estimate a cumulative heat transfer for the combustion event (e.g., as crankshaft 402 rotates from minus-180 degrees to plus-180 degrees), based at least in part on the accumulation of determined current heat transfers to the cylinder surfaces determined at 520. In some examples, at 544, cylinder combustion model 500 may be configured to estimate combustion-related parameters 502 for a combustion event (e.g., as crankshaft 402 rotates from minus-180 degrees to plus-180 degrees), based at least in part on the accumulation of current combustion-related parameters determined by incrementing model 508, such as, for example, one or more of cumulative heat transfer associated with the combustion event, (IMEP, cylinder pressure of the cylinder 120, FMEP, maximum piston side load, maximum cylinder liner bending moment, GIMEP, characteristics of heat flux to cylinder surfaces, total in-cylinder heat transfer, or friction energy to piston and bearings, etc.

Figure 6:
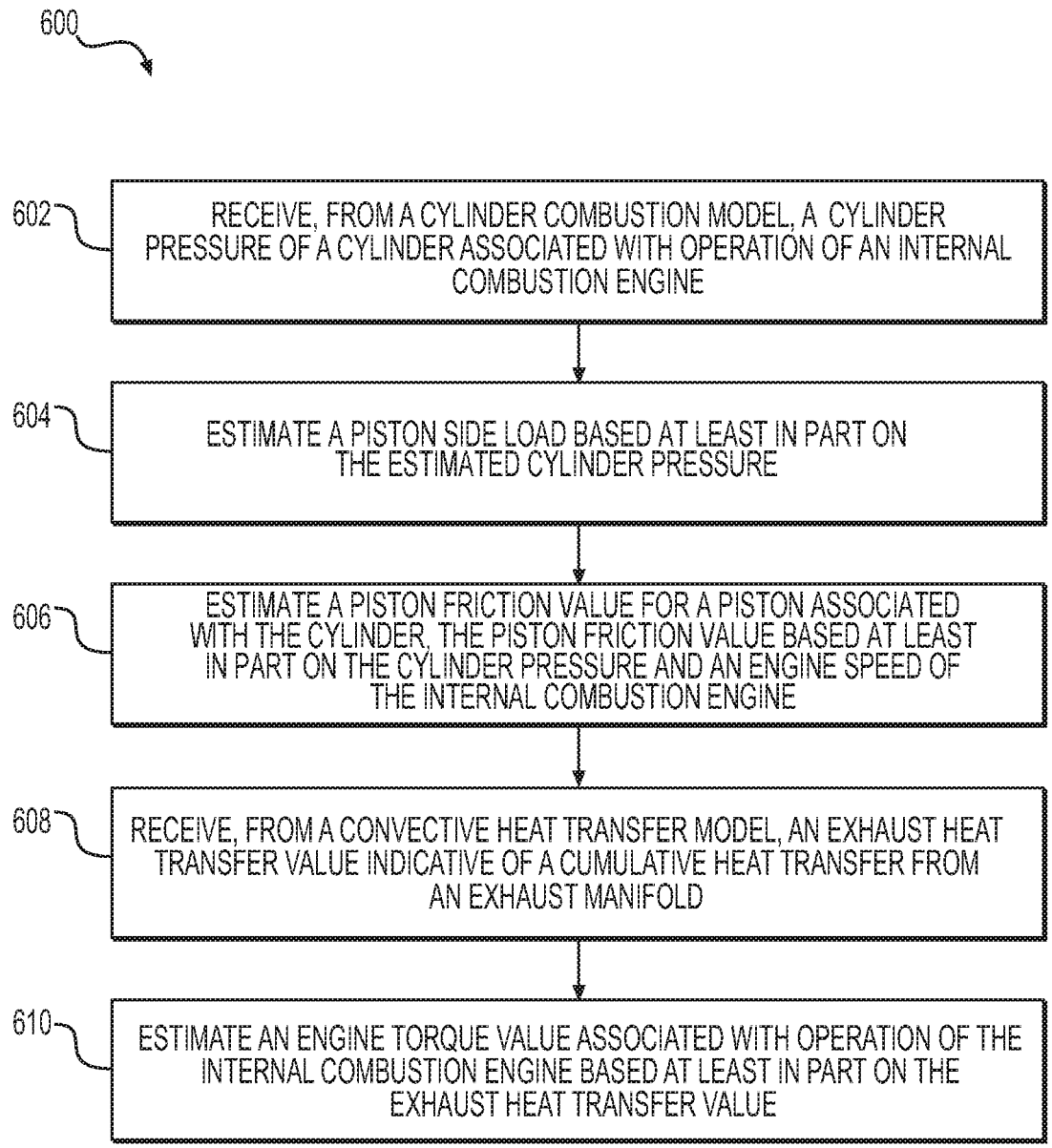
FIG. 6 is a flow diagram of an example process for estimating engine torque associated with operation of an example internal combustion engine.

FIG. 6 illustrates an example process 600 for estimating engine torque associated with operation of an internal combustion engine, such as, for example, internal combustion engine 100. The following actions described with respect to FIG. 6 may be performed, for example, as illustrated with respect to FIGS. 1-5. This process is illustrated as a logical flow graph, the operation of which may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the process.

The example process 600 may include, at 602, receiving, from cylinder combustion model 500, a cylinder pressure at each timestep during the expansion stroke of a cylinder associated with operation of an internal combustion engine. For example, processor(s) 204 may receive peak cylinder pressure indicative of pressure in cylinder 120 during a power stroke cycle of internal combustion engine 100. In some examples, engine torque may be determined, at least in part, from the IMEP, which may be calculated by integrating cylinder pressure with respect to cylinder volume. In other aspects, the combustion model 500 may provide in-cylinder heat transfer, which may be used to calculate the torque.

In other aspects, cylinder combustion model 500, and more precisely, processor(s) 204 executing cylinder combustion model 500, may estimate the cylinder pressure of cylinder 120 by first receiving fuel and air signals from virtual and/or physical sensor(s) indicative of one or more combustion-related parameters associated with combustion model calculations. Processor(s) 204 may obtain one or more values indicative of a volume of fuel and/or a quantity of air supplied to the cylinder 120 by receiving at least one signal via the virtual sensor input interface 300 and/or via physical sensor(s) 104, and saving the one or more values to a working memory (e.g., the memory module 206). The fuel and air signals may be any one or more of fuel signal(s) 504 and/or one or more air signal(s) 506 (FIG. 5), which may include signals from one or more physical sensor(s) 104 and/or signals from one or more virtual sensor model(s) 302. In some examples, cylinder combustion model 500 may be configured to estimate, via processor(s) 204, the peak cylinder pressure associated with the combustion of the fuel and the air supplied to cylinder 120. For example, estimating current pressure may include observing estimated current pressure 530 for a predetermined time period (e.g., one second, five seconds, etc.) and/or for a predetermined number of power strokes or power stroke portions (e.g., one full power stroke or a series of power strokes), receiving estimated current pressure values associated with estimated current pressure 530 at increments, saving the estimated current pressure values to memory module 206, and estimating the current pressure from the saved estimated current pressure values. The current pressure estimation may be a maximum value, or may be derived by mathematical operation on the saved values using one or more acceptable thermodynamic calculation techniques.

At 604, the example process 600 may include estimating a piston side load based at least in part on the estimated cylinder pressure, and more particularly, based at least in part on one or more value(s) output by cylinder combustion model 500, where the values are indicative of cylinder pressure of cylinder 120 that may be used in a piston side load calculation. The piston side load 430 (FIG. 4) may be used, at least in part, to calculate liner bending moment. Estimating the liner bending moment may include execution, via processor(s) 204, of a virtual sensor model (e.g., cylinder combustion model 500), and using output from the cylinder combustion model 500 to estimate the liner bending moment value(s). For example, cylinder combustion model 500 may provide one or more instructions that cause processor(s) 204 to generate the cylinder pressure value(s) as described with respect to 530 (FIG. 5), and save the cylinder pressure value(s) to memory module 206. Processor(s) 204 may reference those memory locations during instantiation of one or more virtual sensor model(s) 302 as input data for calculating the piston side load 430, and for calculating the liner bending moment based in part from the piston side load 430.

At 606, the example process 600 may include estimating a piston friction value for a piston associated with cylinder 120 (e.g., piston 412), based at least in part on the cylinder side load, the cylinder pressure, and/or an engine speed of internal combustion engine 100. The piston friction may be calculated at each timestep, along with the cylinder pressure and piston side load. The friction power may be determined by integrating the friction at each timestep over the engine cycle. In one example, based at least in part on one or more of cylinder pressure value(s), cylinder side load, and/or engine speed, processor(s) 204 may calculate one or more values indicative of piston friction using one or more calculation methods acceptable in the field of mechanical engineering and engine design.

At 608, the example process 600 may further include receiving, via a convective heat transfer model 712, one or more exhaust heat transfer values 720 (FIG. 7) indicative of a cumulative heat transfer from exhaust manifold 124. For example, processor(s) 204 may receive one or more values indicative of exhaust manifold heat flux 434. In one example embodiment, as a brief overview of one example embodiment, convective heat transfer model 712 may estimate exhaust manifold heat flux 434 by obtaining fuel signal(s) 504 and air signal(s) 506, estimating a mean effective pressure in cylinder 120 based at least in part on the air signal(s) and the fuel signal(s), estimating exhaust manifold inlet gas temperature 444, evaluating exhaust manifold heat flux 434, and estimating exhaust manifold temperature 438 by integrating exhaust manifold heat flux 434.

Discussing an example process for estimating cumulative exhaust manifold heat transfer from exhaust manifold 124, process step 608 may include estimating an exhaust gas temperature for exhaust gas entering an exhaust manifold associated with internal combustion engine 100. For example, processor(s) 204 may estimate the exhaust gas temperature by evaluating exhaust energy 432 (FIG. 4), and estimating exhaust manifold heat flux 434 from exhaust manifold 124. In one example, processor(s) 204 may estimate exhaust manifold heat flux 434 via convective heat transfer model 712 (FIG. 7) based at least in part on exhaust gas temperature received from cylinder combustion model 500 (e.g., estimate cumulative heat transfer 542). Estimating the exhaust gas temperature may include receiving one or more values indicative of exhaust manifold inlet gas temperature 444 using one or more of physical sensor(s) 104 and/or virtual sensor model(s) 302.

Processor(s) 204 may generate a rate of temperature change value for exhaust manifold 124 based at least in part on an estimated exhaust gas temperature (and more particularly, based at least in part on exhaust manifold inlet gas temperature 444). Estimating the rate of temperature change value may include estimating a gas-to-manifold heat transfer rate and a manifold-to-air heat transfer rate. Accordingly, generating the rate of temperature change may include using those rates to evaluate a difference of manifold temperature with respect to time. Processor(s) 204 may instantiate one or more virtual sensor model(s) 302, such as, for example, convective heat transfer model 712, to estimate a gas-to-manifold heat transfer rate. The gas-to-manifold heat transfer rate may be indicative of an estimated rate for exhaust heat that transfers from exhaust energy 432 to exhaust manifold 124. Convective heat transfer model 712, when instantiated by processor(s) 204, may be further configured to estimate a manifold-to-air heat transfer rate, which may be indicative of exhaust heat that transfers from exhaust manifold 124 to ambient air 436. Based at least in part on the gas-to-manifold heat transfer rate and the manifold-to-air heat transfer rate, convective heat transfer model 712 may estimate the rate of temperature change value for exhaust manifold 124 via processor(s) 204.

Estimating the gas-to-manifold heat transfer rate may further include obtaining, from memory module 206 and/or database 208, a convection heat transfer coefficient indicative of a convection heat transfer rate between exhaust gas and exhaust manifold 124, and may include obtaining a convection heat transfer coefficient indicative of a convection heat transfer between exhaust manifold 124 and ambient air 436. The convection heat transfer coefficients may be determined using experimental techniques, or may be known values (e.g., as indicated on one or more convective heat transfer coefficient tables or charts). Processor(s) 204 may receive exhaust manifold inlet gas temperature 444, obtain a value from memory module 206 indicative of a surface area value of exhaust manifold 124, and estimate the exhaust heat transfer rate that describes exhaust manifold heat flux 434 to ambient air 436. The estimate for exhaust heat transfer rate may be based at least in part on one or more of the convection heat transfer coefficient (which may be predetermined as stored on memory module 206 and/or database 208), a surface area value indicative of a surface area of exhaust manifold 124 (which may be predetermined as stored on memory module 206 and/or database 208), the exhaust gas temperature, or the instantaneous exhaust manifold temperature.

In one example embodiment, processor(s) 204 may generate the rate of temperature change value for exhaust manifold 124 by integrating the rate of temperature change value for the exhaust manifold for a predetermined time span. For example, processor(s) 204 may evaluate the rate of temperature change value at predetermined intervals of time, and perform a mathematical integration of one or more of the temperature change values. A predetermined time interval may be, for example, one second, five seconds, twenty seconds, etc. Processor(s) 204 may generate the cumulative heat transfer from exhaust manifold 124 by mathematical integration, and provide the value as an input to a turbocharger model (e.g., turbocharger model 806, described hereafter with respect to FIG. 8).

At 610, the example process 600 may further include estimating an engine torque value associated with operation of internal combustion engine 100, based at least in part on the exhaust heat transfer value. For example, processor(s) 204 may estimate a value for brake torque associated with internal combustion engine 100 based, at least in part, on one or more combustion-related parameters. The parameters may include, among other example parameters, GIMEP, PMEP, and/or FMEP. For example, processor(s) 204 may integrate the piston friction value (608) for a predetermined time period to create a cumulative wear estimation value. In one aspect, processor(s) 204 may determine at least one component of engine wear based at least in part on the cumulative wear estimation value. On component of engine wear may include, for example, bearing wear, cylinder liner wear, etc.

In another example embodiment, processor(s) 204 may estimate ignition delay based, at least in part, on other combustion-related parameters (e.g., 502) such as, for example, estimated cylinder temperature, estimated cylinder temperature, etc.

Figure 7:
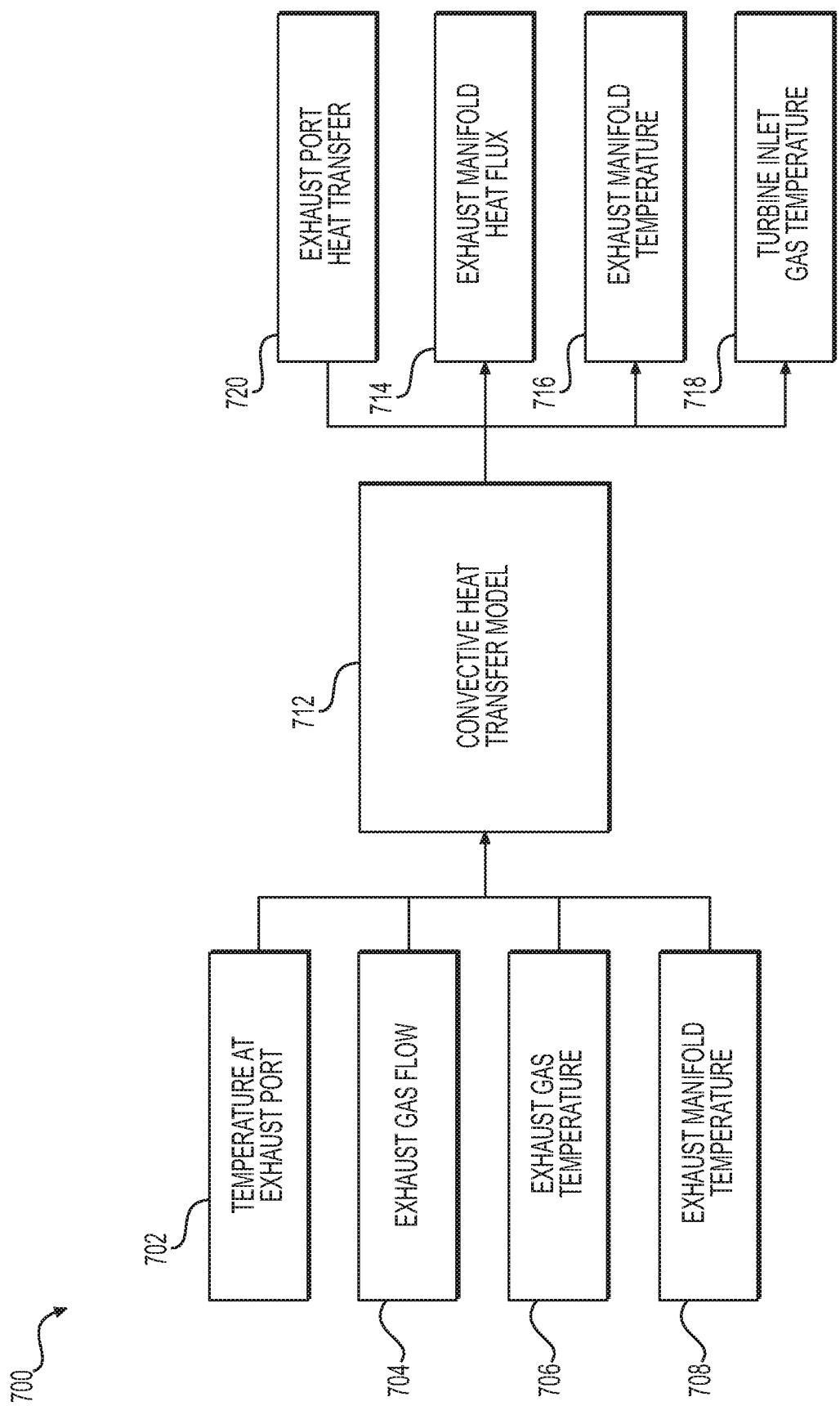
FIG. 7 is a block diagram of an example system including a convective heat transfer model that may be used to estimate engine torque associated with operation of an example internal combustion engine.

FIG. 7 is a block diagram of example virtual sensor system 700. Virtual sensor system 700 may be configured for estimating temperature of an exhaust manifold (e.g., exhaust manifold 124) associated with operation of an example internal combustion engine (e.g., internal combustion engine 100). Virtual sensor system 700 may be one or more of virtual sensor model(s) 302 described with respect to FIG. 3. Virtual sensor system 700, when executed by processor(s) 204 and/or virtual sensor network controller 304, may estimate exhaust manifold temperature of an exhaust manifold associated with operation of an internal combustion engine (e.g., internal combustion engine 100). In one example embodiment, virtual sensor system 700 may receive one or more input signals and/or values, including temperature at an exhaust port 702 (e.g., exhaust manifold inlet gas temperature 444), an exhaust gas flow 704, an exhaust gas temperature 706, and an exhaust manifold temperature 708 other inputs not depicted in FIG. 7.

Figure 8:
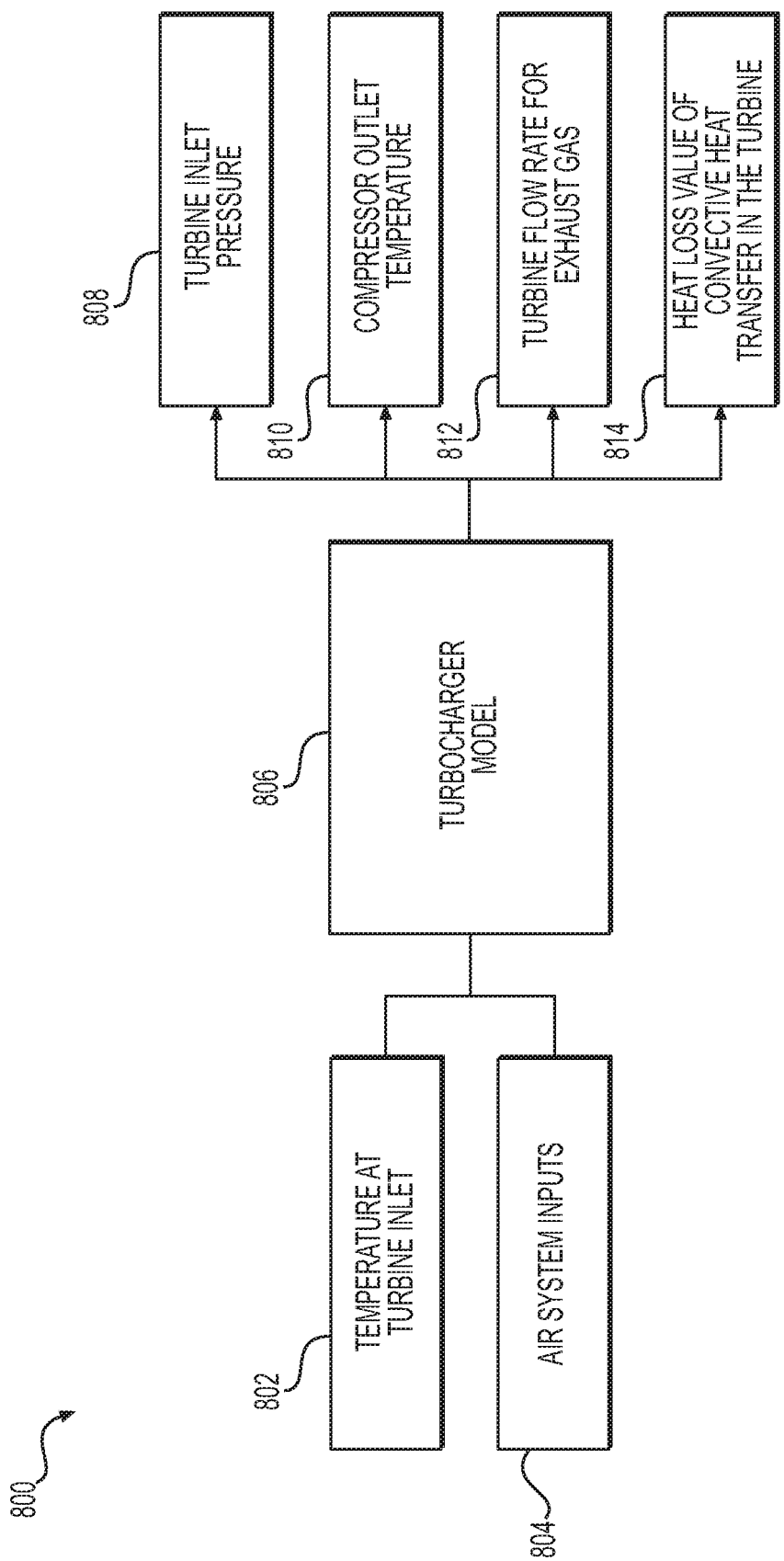
FIG. 8 is a flow diagram of an example system including a turbocharger model that may be used to estimate engine torque associated with operation of an example internal combustion engine.

FIG. 8 is a block diagram of another example virtual sensor system 800. Virtual sensor system 800 may be configured for estimating engine torque associated with operation of an example internal combustion engine (e.g., internal combustion engine 100). Virtual sensor system 800 may be one or more of virtual sensor model(s) 302 described with respect to FIG. 3. Virtual sensor system 800 may estimate brake torque associated with operation of internal combustion engine 100. In one example embodiment, virtual sensor system 800 may receive one or more input signals and/or values, including, for example, temperature at turbine inlet 802, and/or one or more air system inputs 804. Virtual sensor system 800 may include a turbocharger model 806, among other models, that may be configured to output one or more values indicative of turbine inlet pressure 808 (which may be turbine inlet exhaust gas pressure 448 depicted in FIG. 4, for example), compressor outlet temperature 810 (which may indicate an outlet gas flow at compressor outlet 152, for example), turbine flow rate for exhaust gas 812 (which may be turbine flow rate 450, for example), and/or heat loss value of convective heat transfer in the turbine 814 (which may be a value associated with turbine heat flux 452, for example), among other values.

Figure 9:
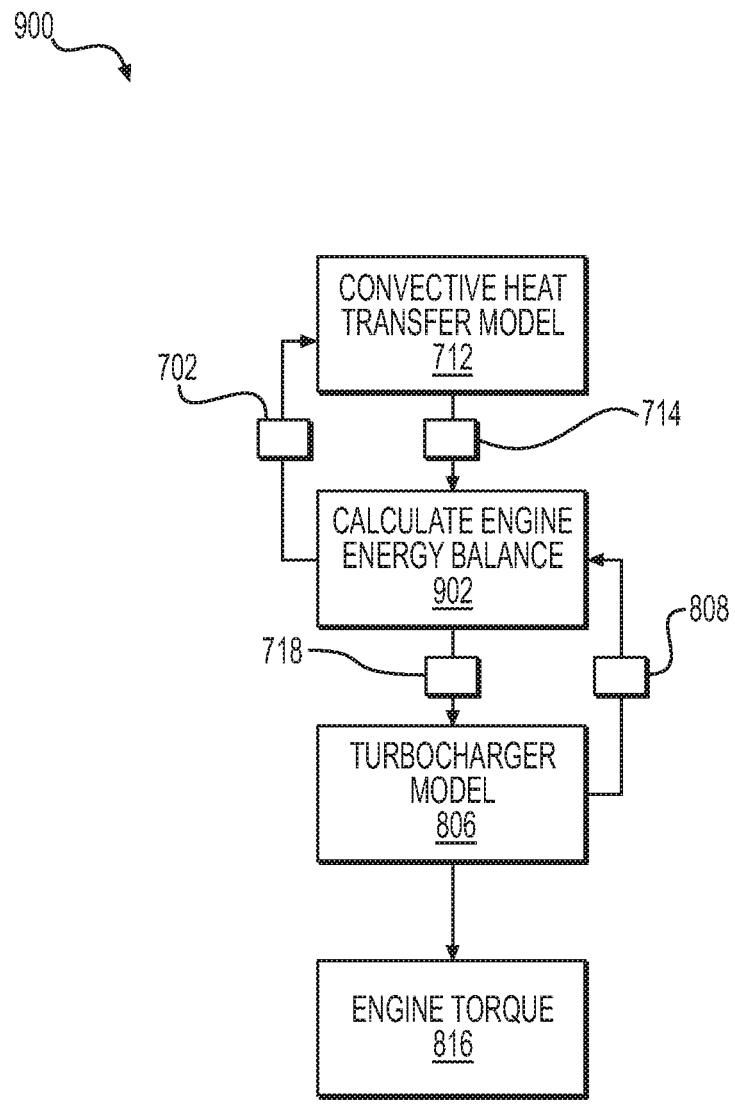
FIG. 9 is a flow diagram depicting an example evaluation of combustion-related parameters, and using the parameters for estimating torque associated with operation of an internal combustion engine.

FIG. 9 is a flow diagram of a process 900 for evaluating combustion-related parameters (e.g., 502, FIG. 5) to generate one or more engine performance metrics and/or estimations such as, for example, engine torque. Process 900 may include implementing a plurality of virtual sensor(s) including, for example, convective heat transfer model 712 and/or turbocharger model 806. In some examples described herein, convective heat transfer model 712 may receive various combustion-related parameters 502 as inputs (depicted in FIG. 7 as 702-710) and output values (e.g., 720, 714, 716, 718) based, at least in part, on inputs 702-710. Although not shown in FIG. 9 for clarity, it may be appreciated that convective heat transfer model 712 may receive inputs 702-710 and/or other values as input(s) to convective heat transfer model 712.

Process 900, at 902, may include calculating an engine energy balance in a manner consistent with calculations known to those skilled in the art of thermodynamics and/or combustion in internal combustion engines. For example, processor(s) 204 may evaluate energy inputs, energy outputs, and evaluate energy balance, such as exhaust manifold heat flux 714. Some example steps for performing aspects of an energy balance calculation are described herein, at least, with respect to FIG. 5. In one example, convective heat transfer model 712 may receive one or more values (e.g., temperature at exhaust port 702) as a feedback input. The input 712 may be generated during (or alternatively, as an output of) calculation of the energy balance at 906. Turbocharger model 806 may iteratively generate, using the three models 712, 902, and 806, the estimated engine torque.

In one embodiment, process 900 may iteratively improve relative accuracy of parameters (702, 714, 718, 808, and 914) by performing multiple iterations that may include receiving feedback inputs 808 and/or 702, for example, until virtual sensor network 110 generates one or more values for estimated parameters (e.g., engine torque). For example, process 900 may include performing three iterations to produce values associated with estimated engine torque with accuracy sufficient for diagnostics and prognostics of internal combustion engine 100. In other examples, process 900 may perform fewer or more iterations. Diagnostics and prognostics may include, for example, brake torque estimation, ignition delay estimation based on an estimated in-cylinder temperature and pressure, fuel burn rate estimation during a pre-mixed burn of fuel in a cylinder, fuel burn rate estimation during a period when an engine may be rate-limited by surface interaction, cylinder pressure estimation based on burn rate estimations, etc. In other non-limiting examples, diagnostics and prognostics based at least in part on estimated engine torque, and/or other combustion-related parameters 502, may include system wear indications, such as, for example, liner wear indication, piston wear indication, bearing wear indication, turbocharger and/or compressor wear indication, etc.

INDUSTRIAL APPLICABILITY

The exemplary systems and related methods of the present disclosure may be applicable to a variety of internal combustion engines operable in automobiles, industrial equipment, work machines, and other types of equipment. Example embodiments described herein may provide real-time estimates of exhaust manifold temperature during operation of an internal combustion engine using an on-board computer system configured with one or more virtual sensor models. Example models such as, for example, convective heat transfer models, cylinder combustion models, turbocharger models, and other virtual sensor models described herein may replace or supplement physical sensors and provide increased accuracy for the sensed (or virtually sensed) operation of an internal combustion engine. For example, embodiments of the present disclosure may increase the reliability of estimated manifold temperature, cylinder temperatures, cylinder pressures, etc., such that combustion-related parameters estimated by the virtual sensor(s) may be usable for real-time estimation of engine torque, evaluation of engine component wear over time, and may be usable for performing other calculations that may diagnose and/or prognosticate engine performance. Moreover, virtual sensors such as those disclosed herein may accompany and/or replace some physical sensors associated with internal combustion engines, which may reduce cost in manufacturing and maintenance of the combustion engine systems, as well as provide increased reliability due to fewer physical sensors that may malfunction or become damaged during operation.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments may be understood to fall within the scope of the present disclosure as determined based upon the claims and any equivalents thereof.

What is claimed is:

1. A computer-implemented method comprising:
    determining, via a cylinder combustion model, a cylinder pressure of a cylinder associated with operation of an internal combustion engine;
    estimating a piston side load based at least in part on the cylinder pressure;
    estimating a piston friction value for a piston associated with the cylinder, the piston friction value based at least in part on the cylinder pressure and an engine speed of the internal combustion engine;
    receiving, via a convective heat transfer model, an exhaust heat transfer value indicative of a cumulative heat transfer from an exhaust manifold of the internal combustion engine;
    estimating an engine torque value associated with operation of the internal combustion engine based at least in part on the exhaust heat transfer value;
    determining a performance-related operating characteristic of the internal combustion engine based on the piston side load, the piston friction value, and the engine torque value;
    generating a predicted maintenance requirement of the internal combustion engine based, at least in part, on the performance-related operating characteristic; and
    causing an electronic device to output the performance-related operating characteristic or the predicted maintenance requirement;
    receiving an input corresponding to the performance-related operating characteristic or the predicted maintenance requirement; and
    modifying the performance-related operating characteristic or the predicted maintenance requirement based at least in part on the input.

2. The computer-implemented method of claim 1, wherein the determining the cylinder pressure comprises:
    receiving a fuel signal indicative of an amount of fuel supplied to the cylinder;
    receiving an air signal indicative of an amount of air supplied to the cylinder; and
    estimating, with the cylinder combustion model, the cylinder pressure based at least in part on the fuel signal and the air signal.

3. The computer-implemented method of claim 1, wherein further comprising:
estimating, via the cylinder combustion model, a liner bending moment of the cylinder based at least in part on the piston side load.

4. The computer-implemented method of claim 3, further comprising determining at least one component of engine wear based at least in part on the liner bending moment.

5. The computer-implemented method of claim 4, wherein the determining the at least one component of engine wear comprises:
integrating the piston friction value for a predetermined period of time to create a cumulative wear estimation value.

6. The computer-implemented method of claim 5, wherein the determining the at least one component of engine wear further comprises determining the at least one component of engine wear based at least in part on the cumulative wear estimation value.

7. The computer-implemented method of claim 1, further comprising generating a virtual sensor output of a turbocharger model, the generating comprising:
estimating turbine inlet temperature of a turbine associated with a compressor, the estimating based at least in part on the exhaust heat transfer value;
estimating a turbine inlet pressure indicative of an air pressure at an inlet of the turbine, based at least in part on the exhaust heat transfer value;
generating a turbine flow rate indicative of a mass flow rate for exhaust gas flowing from the exhaust manifold;
estimating a heat loss value of convective heat transfer in the turbine;
generating a value indicative of compressor outlet temperature based at least in part on the convective heat transfer model and the heat loss value of convective heat transfer in the turbine.

8. A computer-readable storage medium having computer-executable instructions stored thereupon which, when executed by a computer, cause the computer to perform operations comprising:
determine, via a cylinder combustion model, a cylinder pressure of a cylinder associated with operation of an internal combustion engine;
estimate a piston side load based at least in part on the cylinder pressure;
estimate a piston friction value for a piston associated with the cylinder, the piston friction value based at least in part on the cylinder pressure and an engine speed of the internal combustion engine;
receive, via a convective heat transfer model, an exhaust heat transfer value indicative of a cumulative heat transfer from an exhaust manifold of the internal combustion engine;
estimate an engine torque value associated with operation of the internal combustion engine based at least in part on the exhaust heat transfer value;
determine a performance-related operating characteristic of the internal combustion engine based on the piston side load, the piston friction value, and the engine torque value;
generate a predicted maintenance requirement of the internal combustion engine based, at least in part, on the performance-related operating characteristic; and
cause an electronic device to output the performance-related operating characteristic or the predicted maintenance requirement;
receive an input corresponding to the performance-related operating characteristic or the predicted maintenance requirement; and
modify the performance-related operating characteristic or the predicted maintenance requirement based at least in part on the input.

9. The computer-readable storage medium of claim 8, wherein the determination of the cylinder pressure comprises:
receiving a fuel signal indicative of an amount of fuel supplied to the cylinder;
receiving an air signal indicative of an amount of air supplied to the cylinder; and
estimating, with the cylinder combustion model, the cylinder pressure based at least in part on the fuel signal and the air signal.

10. The computer-readable storage medium of claim 8, wherein the operations further comprise:
estimate, via the cylinder combustion model, a liner bending moment of the cylinder based at least in part on the piston side load.

11. The computer-readable storage medium of claim 10, the operations further comprise determine at least one component of engine wear based at least in part on the liner bending moment.

12. The computer-readable storage medium of claim 11, wherein the determination of the at least one component of engine wear comprises:
integrating the piston friction value for a period of time to create a cumulative wear estimation value.

13. The computer-readable storage medium of claim 12, wherein the determination of the at least one component of engine wear further comprises determining the at least one component of engine wear based at least in part on the cumulative wear estimation value.

14. The computer-readable storage medium of claim 8, the operations further comprise generate a virtual sensor output of a turbocharger model, the generation comprises:
estimate turbine inlet temperature of a turbine associated with a compressor, the estimating based at least in part on the exhaust heat transfer value;
estimate a turbine inlet pressure indicative of an air pressure at an inlet of the turbine, based at least in part on the exhaust heat transfer value;
generate a turbine flow rate indicative of a mass flow rate for exhaust gas flowing from the exhaust manifold;
estimate a heat loss value of convective heat transfer in the turbine;
generate a value indicative of compressor outlet temperature based at least in part on the convective heat transfer model and the heat loss value of convective heat transfer in the turbine.

15. A system for estimating an engine torque value via a virtual sensor network, the system comprising:
at least one processor configured for performing one or more acts comprising:
determining, of a cylinder combustion model, a cylinder pressure of a cylinder associated with operation of an internal combustion engine;
estimating a piston side load based at least in part on the cylinder pressure;
estimating a piston friction value for a piston associated with the cylinder, the piston friction value based at least in part on the cylinder pressure and an engine speed of the internal combustion engine;

receiving, via a convective heat transfer model, an exhaust heat transfer value indicative of a cumulative heat transfer from an exhaust manifold of the internal combustion engine;

estimating an engine torque value associated with operation of the internal combustion engine based at least in part on the exhaust heat transfer value;

determining a performance-related operating characteristic of the internal combustion engine based on the piston side load, the piston friction value, and the engine torque value;

obtaining a predicted maintenance requirement of the internal combustion engine;

determining an adjustment to the predicted maintenance requirement of the internal combustion engine based, at least in part, on the performance of the internal combustion engine; and notifying, via an electronic communications network, an electronic device associated with maintenance of the internal combustion engine of the adjustment to the predicted maintenance requirement of the internal combustion engine.

16. The system of claim 15, wherein the determining the cylinder pressure comprises:

receiving a fuel signal indicative of an amount of fuel supplied to the cylinder;

receiving an air signal indicative of an amount of air supplied to the cylinder; and estimating, with the cylinder combustion model, the cylinder pressure based at least in part on the fuel signal and the air signal.

17. The system of claim 15, wherein the acts further comprising:

estimating, via the cylinder combustion model, a liner bending moment of the cylinder based at least in part on the piston side load.

18. The system of claim 17, the acts further comprising determining at least one component of engine wear based at least in part on the liner bending moment of the cylinder.

19. The system of claim 18, wherein the determining the at least one component of engine wear comprises:

integrating the piston friction value for a period of time to create a cumulative wear estimation value; and determining the at least one component of engine wear based at least in part on the cumulative wear estimation value.

20. The system of claim 15, the acts further comprising estimating exhaust gas pressure at an inlet port of a turbine associated with the internal combustion engine, the estimating comprising:

estimating turbine inlet temperature, the estimating based at least in part on the exhaust heat transfer value;

estimating a turbine inlet pressure indicative of an air pressure at the inlet port of the turbine, based at least in part on the exhaust heat transfer value;

generating a turbine flow rate indicative of a mass flow rate for exhaust gas flowing from the exhaust manifold;

estimating a heat loss value of convective heat transfer in the turbine; and generating a value indicative of compressor outlet temperature based at least in part on the convective heat transfer model and the heat loss value of convective heat transfer in the turbine.

* * * * *